US009829348B2

(12) United States Patent
Wang et al.

(10) Patent No.: US 9,829,348 B2
(45) Date of Patent: Nov. 28, 2017

(54) IDENTIFYING A POSITION OF A BRUSHLESS DC MOTOR

(71) Applicant: Marvell World Trade Ltd., St. Michael (BB)

(72) Inventors: Yichao Wang, Singapore (SG); Foo Leng Leong, Singapore (SG)

(73) Assignee: Marvell World Trade Ltd., St. Michael (BB)

( * ) Notice: Subject to any disclaimer, the term of this patent is extended or adjusted under 35 U.S.C. 154(b) by 398 days.

(21) Appl. No.: 14/488,211

(22) Filed: Sep. 16, 2014

(65) Prior Publication Data

US 2015/0084615 A1     Mar. 26, 2015

Related U.S. Application Data

(60) Provisional application No. 61/880,311, filed on Sep. 20, 2013.

(51) Int. Cl.
| | |
|---|---|
| *G01R 25/00* | (2006.01) |
| *G01D 5/243* | (2006.01) |
| *G01D 5/14* | (2006.01) |
| *G01D 5/244* | (2006.01) |
| *H02P 6/18* | (2016.01) |

(52) U.S. Cl.
CPC ............. *G01D 5/243* (2013.01); *G01D 5/14* (2013.01); *G01D 5/244* (2013.01); *H02P 6/183* (2013.01)

(58) Field of Classification Search
CPC ...... G01D 5/24409; G01D 5/14; G01D 5/244; G01D 5/243; H02P 6/183

USPC ........................................................ 324/76.77
See application file for complete search history.

(56) References Cited

U.S. PATENT DOCUMENTS

| | | | | |
|---|---|---|---|---|
| 6,091,222 A | * | 7/2000 | Vertemara | H02P 6/21 318/254.2 |
| 2010/0141191 A1 | * | 6/2010 | Chen | H02P 6/18 318/400.33 |
| 2012/0119687 A1 | * | 5/2012 | Murai | H02P 6/14 318/400.06 |
| 2012/0235609 A1 | | 9/2012 | Ide et al. | |

FOREIGN PATENT DOCUMENTS

| | | |
|---|---|---|
| CN | 101339644 A | 1/2009 |
| EP | 2437391 A1 | 4/2012 |

OTHER PUBLICATIONS

International Search Report and Written Opinion for PCT/IB2014/001869, filed Sep. 18, 2014.
Office Action from the Chinese Patent Office for Application No. 201480042221.3, dated May 26, 2017.

* cited by examiner

*Primary Examiner* — Melissa Koval
*Assistant Examiner* — Courtney McDonnough

(57) ABSTRACT

A method for identifying a position of a multi-phase brushless motor includes applying a plurality of detection voltage pulses to the motor, each detection voltage pulse corresponding to a respective driving phase of the motor, measuring a time period associated with a current reaching a predetermined current limit for each applied detection voltage pulse, and identifying a driving phase associated with a shortest time period for the current to reach the predetermined current limit.

17 Claims, 7 Drawing Sheets

IDENTIFYING A POSITION OF A BRUSHLESS DC MOTOR

CROSS REFERENCE TO RELATED APPLICATIONS

This present disclosure claims the benefit of U.S. Provisional Application No. 61/880,311, filed on Sep. 20, 2013, which is incorporated by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Brushless DC (direct current) motors comprise a multiphase electric motor (hereinafter the motor) and a motor driver circuit. In operation, the motor driver circuit transforms a DC power source into a plurality of AC (alternating current) signals which are used to drive the motor. The motor driver circuit generates the AC signals according to a position of a rotor of the motor with respect to one or more of a plurality of coils of the motor.

Back-EMF detection may be used to determine the position of the rotor with respect to the coils. However, the back-EMF of the motor may be weak and unreliable for use in determining the rotor position when the rotor is being started. Inductive sensing may be used to determine the position of the rotor when the motor is being started. An effective inductance of each coil of the motor varies depending on the position of the rotor relative to each coil. During inductive sensing, voltage pulses are applied to the each of the plurality of coils, and the position of the rotor is determined by analyzing a slope of a current induced within each coil

SUMMARY

In an embodiment, a method for identifying a position of a multi-phase brushless motor includes applying a plurality of detection voltage pulses to the motor, each detection voltage pulse corresponding to a respective driving phase of the motor, measuring a time period associated with a current reaching a predetermined current limit for each applied detection voltage pulse, and identifying a driving phase associated with a shortest time period for the current to reach the predetermined current limit.

In an embodiment, the method includes applying at least one dummy voltage pulse to the motor before the plurality of detection voltage pulses.

In an embodiment, the method includes applying a first dummy voltage pulse and a second dummy voltage pulse to the motor.

In an embodiment, the motor is a three-phase brushless motor, and the plurality of detection voltage pulses includes six detection voltage pulses.

In an embodiment, applying the plurality of detection voltage pulses includes applying the plurality of detection voltage pulses before the shortest time period is identified.

In an embodiment, the plurality of applied detection voltage pulses are generated using a motor voltage.

In an embodiment, each of the applied detection voltage pulses is generated using a motor voltage having a voltage level raised by a preceding dummy voltage pulse or raised by a preceding applied detection voltage pulse, and each of the applied detection voltage pulses is generated using a motor voltage having a substantially similar voltage level to each other applied detection voltage pulse.

In an embodiment, the method includes applying a dummy voltage pulse that raises a voltage level of a motor voltage used to generate an initial detection voltage pulse applied to the motor.

In an embodiment, an apparatus includes a voltage pulse circuit configured to generate a plurality of detection voltage pulses, and a position identification circuit configured to determine a single detection voltage pulse of the plurality detection voltage pulses according to a plurality of currents associated with respective detection voltage pulses of the plurality of detection voltage pulses.

In an embodiment, the position identification circuit is configured to determine a plurality of time periods for the plurality of currents to reach a predetermined value, respectively, and determine the single detection voltage pulse associated with the current having the shortest time period of the plurality of time periods.

In an embodiment, the voltage pulse module generates at least one dummy voltage pulse prior to generating the plurality of detection voltage pulses.

In an embodiment, the voltage pulse module generates a plurality of dummy voltage pulses.

In an embodiment, the voltage pulse module generates the detection voltage pulses before the shortest time period is determined.

In an embodiment, the apparatus includes a multi-phase brushless motor, and induces a dummy current in a driving phase of the motor using the at least one dummy voltage pulse, and induces the plurality of currents associated with respective detection voltage pulses in respective driving phases of a plurality of driving phases of the motor.

In an embodiment, each of the plurality of currents associated with respective detection voltage pulses is generated using a motor voltage, a cessation of each of the detection voltage pulses causes an increase in a voltage level of the motor voltage to a level above a nominal level, and, a cessation of the dummy voltage pulse causes an increase in the voltage level of the motor voltage substantially similar to the increase caused by each of the detection voltage pulses.

In an embodiment, a method for identifying a position of a three-phase brushless DC motor includes raising a voltage level of a first detection voltage pulse to be applied to the three-phase brushless DC motor for each phase of the three-phase DC brushless motor, applying the first detection voltage pulse to the three-phase brushless DC motor having the raised voltage level, applying detection voltage pulses to the three-phase brushless DC motor having voltage levels similar to the voltage level of the first detection voltage pulse, measuring a time period associated with a phase current reaching a predetermined current limit for each applied detection voltage pulse, and identifying a phase associated with a shortest time period for the phase current to reach the predetermined current limit.

DETAILED DESCRIPTION

Figure 1:
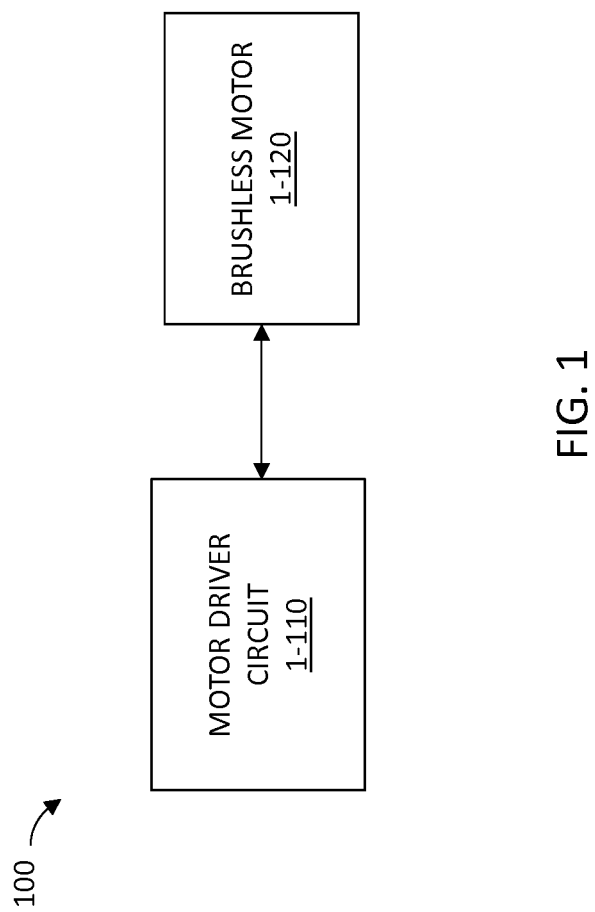
FIG. 1 is a block diagram illustrating a brushless DC motor system, e.g., a three-phase brushless DC motor system, according to an embodiment of the disclosure.

FIG. 1 shows a multi-phase brushless DC motor system 100 according to an embodiment. The brushless DC motor system 100 includes a motor driver circuit 1-110 and a multi-phase brushless motor 1-120. The motor driver circuit 1-110 includes various devices and components used to drive (e.g., electrically commutate) the motor 120, such as commutation logic components configured to drive the motor 1-120, external power field-effect transistors (FETs), temperature monitoring components, start-up components, and so on. In an embodiment, the motor driver circuit 1-110 includes a microprocessor executing computer programming instructions from a non-transient computer-readable media.

Figure 2:
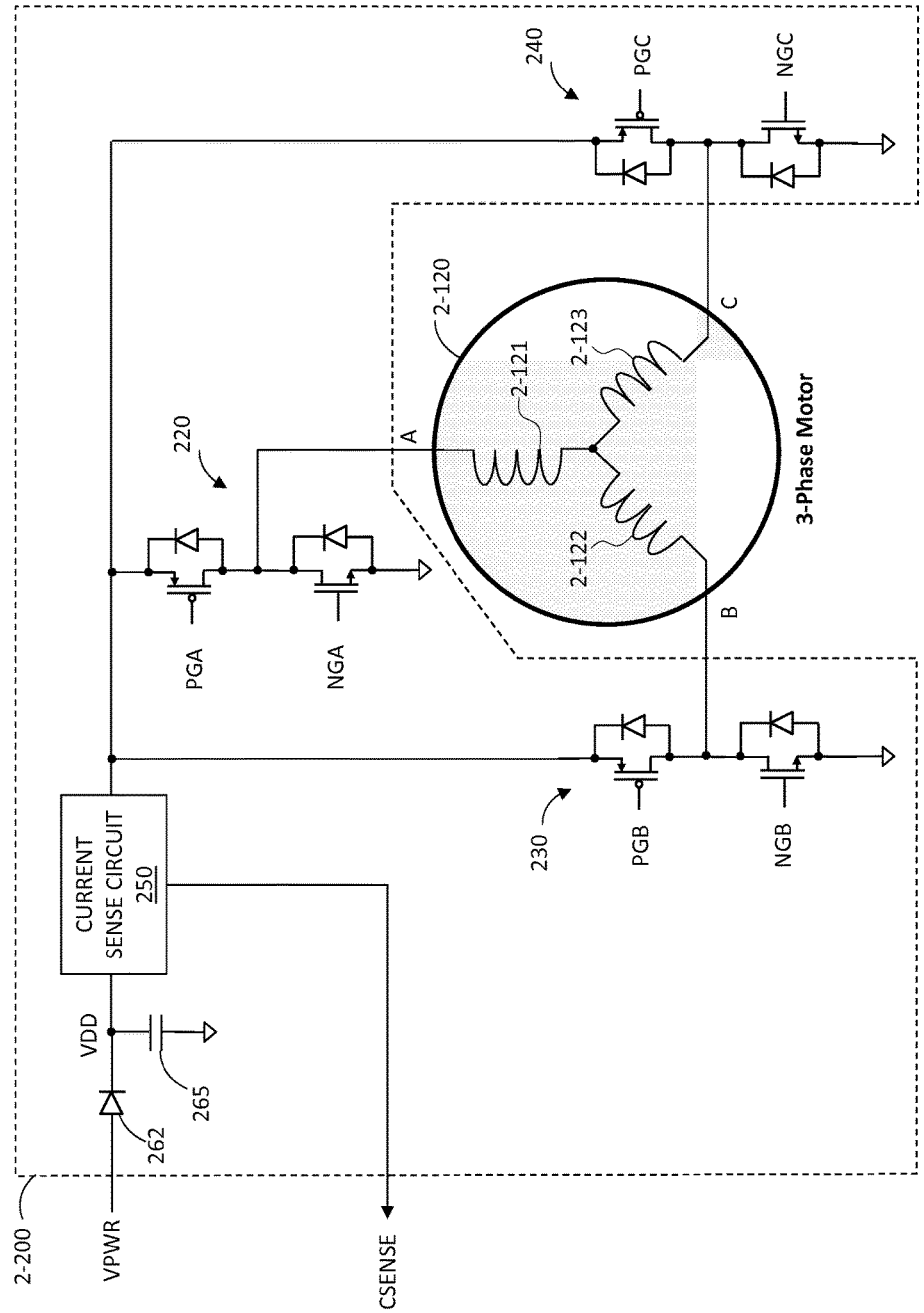
FIG. 2 shows a circuit for controlling a brushless motor, e.g., a three-phase brushless motor.

In an embodiment, the multi-phase brushless DC motor system 100 is a three-phase brushless motor system and the multi-phase brushless motor 1-120 is a three-phase brushless motor. In another embodiment, the multi-phase brushless DC motor system 100 is a two-phase brushless motor system and the multi-phase brushless motor 1-120 is a two-phase brushless motor. However, embodiments are not limited to two- or three-phase systems FIG. 2 shows a motor power stage circuit 2-200 connected to a three-phase brushless motor 2-120. The motor 2-120 includes first, second, and third coils 2-121, 2-122, and 2-123. First ends of the first, second, and third coils 2-121, 2-122, and 2-123 are connected to terminals A, B, and C, respectively. Second ends of the first, second, and third coils 2-121, 2-122, and 2-123 are connected to each other.

Although the first, second, and third coils 2-121, 2-122, and 2-123 are shown configured in a wye configuration, embodiments are not limited thereto. In an embodiment, the first, second, and third coils 2-121, 2-122, and 2-123 are connected in a delta configuration.

The motor power stage circuit 2-200 includes first driving circuitry 220 connected to terminal A, second driving circuitry 230 connected to terminal B, and third driving circuitry 240 connected to terminal C. The motor power stage circuit 2-200 further includes a diode 262, a capacitor 265 and a current sense circuit 250.

A power supply voltage VPWR is provided to the capacitor 265 through the diode 262 to provide a motor voltage VDD. The diode 262 protects the power supply voltage VPWR from voltage surges caused by changes in the current flowing through the phases of the motor 2-120. The voltages surges charge the capacitor 265. As a result, the motor voltage VDD may at times have a higher voltage level than a nominal voltage level provided by the power supply voltage VPWR.

The current sense circuit 250 is connected between the first, second, and third driving circuitry 220, 230, and 240 of the motor voltage VDD, and produces a current sense signal CSENSE according to a current flowing through a coil of the motor 2-120. In an embodiment, the current sense signal CSENSE has a voltage that changes in proportion to changes in the current flowing through the coil of the motor 2-120. In an embodiment, the current sense circuit 250 is instead connected between the first, second, and third driving circuitry 220, 230, and 240 and ground.

A motor driver circuit, such as the motor driver circuit 1-110 of FIG. 1, controls currents in the phases of the motor 2-120 using first, second, and third positive control signals PGA, PGB, and PGC and first, second, and third negative control signals NGA, NGB, and NGC. The first, second, and third positive control signals PGA, PGB, and PGC having a first value, e.g., a low voltage, connects the terminals A, B, and C of the motor 2-120, respectively, to the motor voltage VDD. The first, second, and third negative control signals NGA, NGB, and NGC having a second value, e.g., a high voltage, connects the terminals A, B, and C of the motor 2-120, respectively, to ground. The first, second, and third positive control signals PGA, PGB, and PGC having the second value and the first, second, and third negative control signals NGA, NGB, and NGC having the first value leaves the terminals A, B, and C of the motor 2-120, respectively, floating; that is, not connected to either of VDD or ground.

The motor driver circuit controls the first, second, and third positive control signals PGA, PGB, and PGC and first, second, and third negative control signals NGA, NGB, and NGC to produce first through sixth driving phases of the motor 2-120. Table 1 below shows each of the six phases.

As shown in Table 1, during each phase exactly one of terminals A, B, and C is connected to the motor voltage VDD, and exactly one other of terminals A, B, and C is connected to ground. As a result, in each of the first through sixth driving phases, a current flows in a first direction (+) in one of the first, second, and third coils 2-121, 2-122, and 2-123, flows in an opposite direction (−) in a different one of said coils, and no current flows in the remaining one of the coils.

TABLE 1

| | Control Signals | | | | | | Terminal Voltage | | | Coil Current | | |
|---|---|---|---|---|---|---|---|---|---|---|---|---|
| Phase | PGA | NGA | PGB | NGB | PGC | NGC | A | B | C | 1st | 2nd | 3rd |
| 1 | L | L | H | H | H | L | VDD | Gnd | Float | + | − | 0 |
| 2 | L | L | H | L | H | H | VDD | Float | Gnd | + | 0 | − |
| 3 | H | L | L | L | H | H | Float | VDD | Gnd | 0 | + | − |
| 4 | H | H | L | L | H | L | Gnd | VDD | Float | − | + | 0 |
| 5 | H | H | H | L | L | L | Gnd | Float | VDD | − | 0 | + |
| 6 | H | L | H | H | L | L | Float | Gnd | VDD | 0 | − | + |
| none | H | L | H | L | H | L | Float | Float | Float | | | |

When no driving phase is active, the terminals A, B, and C are floated. When a current is present in one of the first, second, and third coils 2-121, 2-122, and 2-123 connected to a floated terminal of terminals A, B, and C, respectively, the coil current will be dumped into the first, second, and third drive circuitry 220, 230, and 240, respectively. When all phases are tri-stated and residual current is present in one of the first, second, and third coils 2-121, 2-122, 2-123, the dumped coil current will be dumped back to capacitor 265, raising up the level of the motor voltage VDD.

The motor driver circuit may generate a detection voltage pulse for each of the first through sixth driving phases of the motor 2-120 in order to identify a position of the rotor of the motor 2-120. For each of the first through sixth driving phases, the selected driving phase will be driven until a current in a coil reaches a predetermined current limit, as indicated by the current sense signal CSENSE. When the current reaches the predetermined current limit, no driving phase is driven and the terminals A, B, and C are tri-stated. After the current decays to a zero value, the next driving phase is driven (e.g., after a certain duration of time). The position of the rotor of the motor 2-120 is determined by measuring the time it takes for each of the first through sixth driving phases to reach the predetermined current limit.

However, during the tri-state phase after a driving phase is driven, that is, after the cessation of a detection voltage pulse, the coil current will be dumped back into the capacitor 265 and raise the level of the motor voltage VDD. As a result, only the initial driving phase that is driven sees a steady-state motor voltage VDD level, and all subsequent driving phases will see an elevated motor voltage VDD level. This difference in the voltage level used with the first detection voltage pulse and the voltage level used with subsequent detection voltages pulses may cause incorrect detection at certain motor positions.

Figure 3:
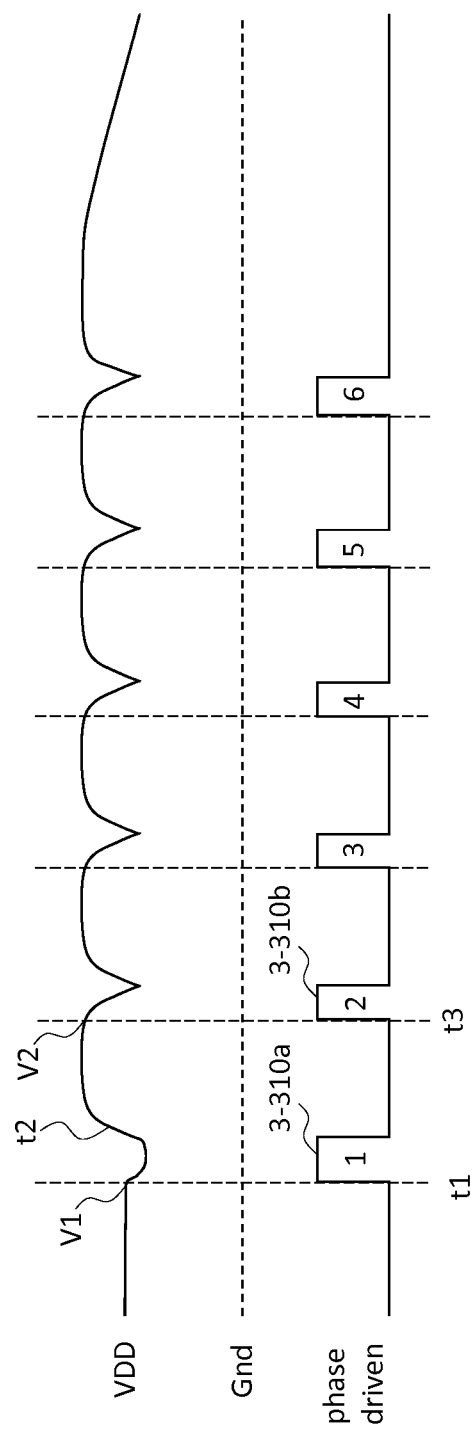
FIG. 3 illustrates an operation related to a brushless motor.

FIG. 3 illustrates a non-uniformity of a motor voltage VDD between first and successive detection voltage pulses. At a first time t1, a first driving phase of the motor 2-120 is driven, as indicated by a first detection pulse 3-310a. The motor voltage VDD used at the first time t1 to generate a first measurement current in the first driving phase is a nominal VDD voltage V1. At a second time t2, the first driving phase of the motor 2-120 cease to be driven, and a coil current flows into the capacitor 265, raising the motor voltage VDD to a voltage above the nominal VDD voltage. At a third time t3, a second driving phase of the motor 2-120 is driven, as indicated by a second detection pulse 3-310b. Unlike at the first time t1, the motor voltage VDD used at the third time t3 to generate a second measurement current in the second driving phase is an elevated voltage V2 higher than the nominal VDD voltage V1, and as a result the measurement conducted using the first measurement pulse 3-310a may be imprecise relative to the measurement conducted using the second measurement pulse 3-310b.

Figure 4:
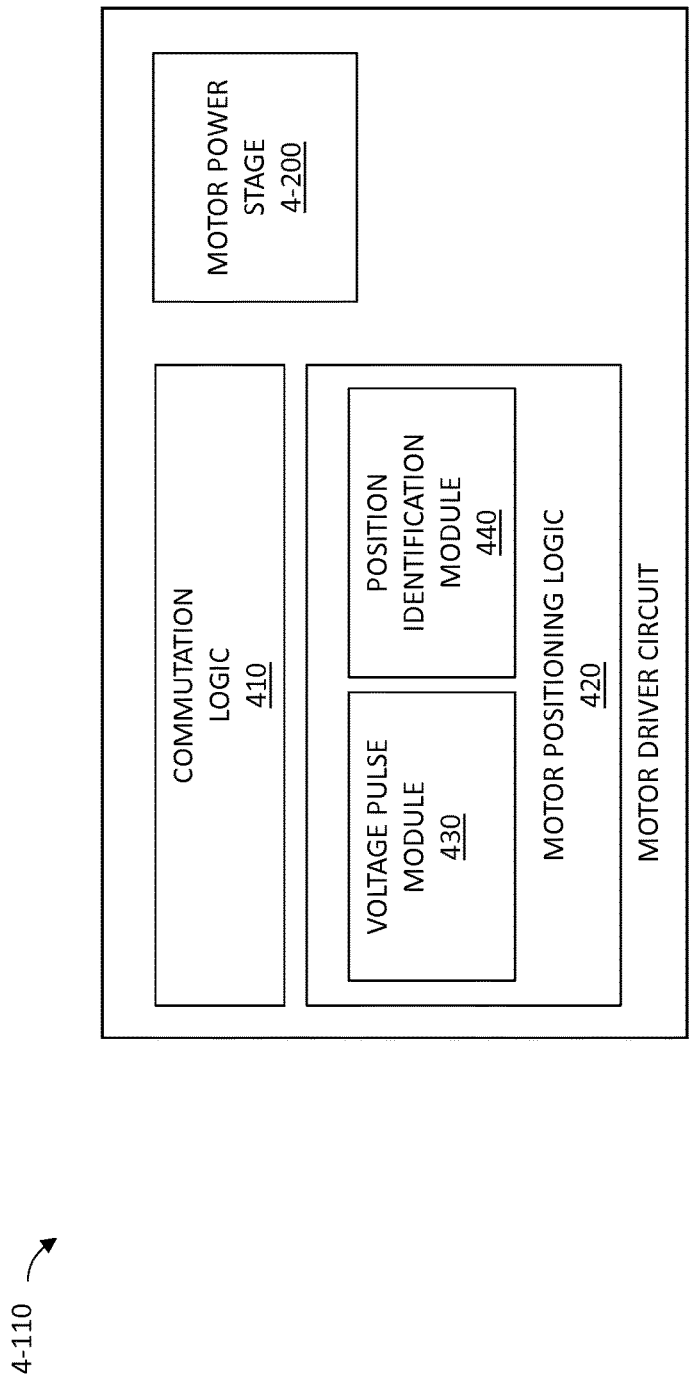
FIG. 4 is a block diagram illustrating components of a motor driver circuit according to an embodiment.

FIG. 4 shows the components of the motor driver circuit 4-110 according to an embodiment. The motor driver 4-110 includes commutation logic 410 that controls a motor power stage 4-200 such as the motor power stage 2-220 of FIG. 2, and motor positioning logic 420 that determines a position of the three-phase brushless motor 2-120. In an embodiment, the motor driver circuit 4-110 is included in an integrated circuit. In an embodiment, the commutation logic 410 and motor positioning logic 420 are included in an integrated circuit, and some or all of the motor power stage 4-200 is external to the integrated circuit.

The motor positioning logic 420 includes a voltage pulse module 430 that applies detection voltage pulses to the three-phase brushless motor 2-120 for each of the six driving phases of the three-phase brushless motor and at least one dummy or non-detection voltage pulse to a driving phases of the three-phase brushless motor 2-120. The voltage pulse module 430 also generates dummy (that is, non-detection) voltages pulses to the three-phase brushless motor 2-120.

The motor positioning logic 420 also includes a position identification module 440 that measures, for each applied detection voltage pulse, a time period associated with a current reaching a predetermined current limit, and identifies a driving phase associated with a shortest time period for the current to reach the predetermined current limit.

Figure 5A:
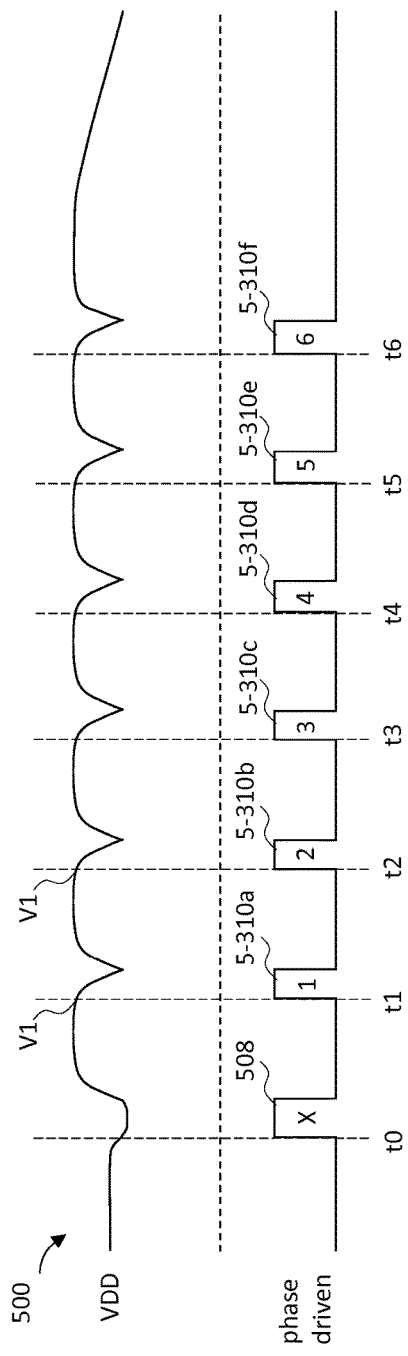
FIGS. 5A and 5B illustrate operations related to brushless motor according to embodiments.
Figure 5B:
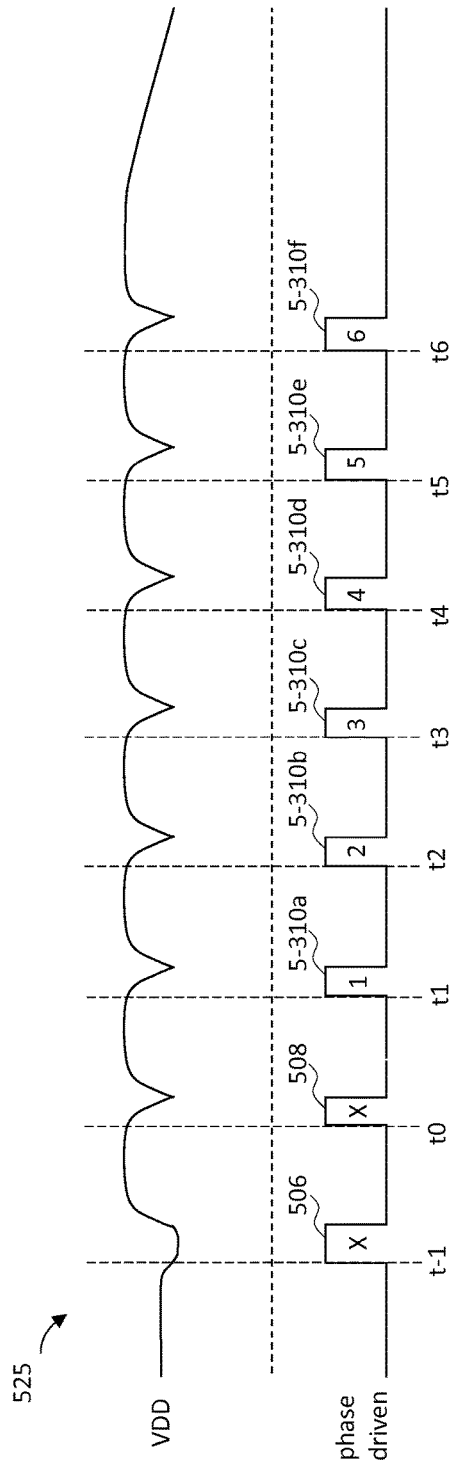

FIGS. 5A and 5B illustrate first and second operations of the motor driver circuit 4-110 according to an embodiment. In each operation shown in FIGS. 5A and 5B, at least one driving phases of the brushless motor 3-120 is driven with at least one dummy voltage pulse prior to the driving phases being driven with detection voltages pulses.

FIG. 5A depicts a voltage pulse configuration 500 that includes first through sixth detection voltage pulses 5-310a through 5-310f. The number of detection voltage pulses 5-310a through 5-310f corresponds to the number of driving phases of the brushless motor 2-120. FIG. 5A further depicts a dummy (that is, a non-detection) voltage pulse 508.

The voltage pulse module 430 generates the dummy voltage pulse 508 at a first preceding time t0 before applying the detection voltage pulses 5-310a through 5-310f at first through sixth time t1 through t6, respectively, in order to the motor voltage VDD to a first elevated voltage V1. The first elevated voltage V1 is then used at first time t1 to generate a current in the three-phase brushless motor 2-120 during the first detection voltage pulse 5-310a. The first elevated voltage V1 or a substantially equal voltage thereto is also used at second through sixth times t2 through t6 to generate a current in the three-phase brushless motor 1-120 during the second through sixth detection voltage pulse 5-310a through 5-310a, respectively.

The dummy voltage pulse 508 may generate a current in any one of the driving phases of the three-phase brushless motor 2-120. In an embodiment, the dummy voltage pulse 508 generates a current in the same driving phase as the first detection voltage pulse 5-310a.

FIG. 5B depicts a voltage pulse configuration 525 that includes the first through sixth detection voltage pulses 5-310a through 5-310f at times t1 through t6, respectively, a first dummy voltage pulse 508 at first preceding time t0, and a second dummy voltage pulse 506 at second preceding time t−1. The voltage pulse module 430 applies the dummy voltage pulses 406 and 408 before applying the detection voltage pulses 5-310a through 5-310f, as described with respect to FIG. 5A.

Each of the first and second dummy voltage pulses 508 and 506 may generate a current in any one of the driving phases of the three-phase brushless motor 2-120. In an embodiment, the first dummy voltage pulse 508 generates a current in the same driving phase as the second dummy voltage pulse 506 detection voltage pulse 5-310a. In an embodiment, first dummy voltage pulse 508 generates a current in the same driving phase as the first detection voltage pulse 5-310a.

Figure 6:
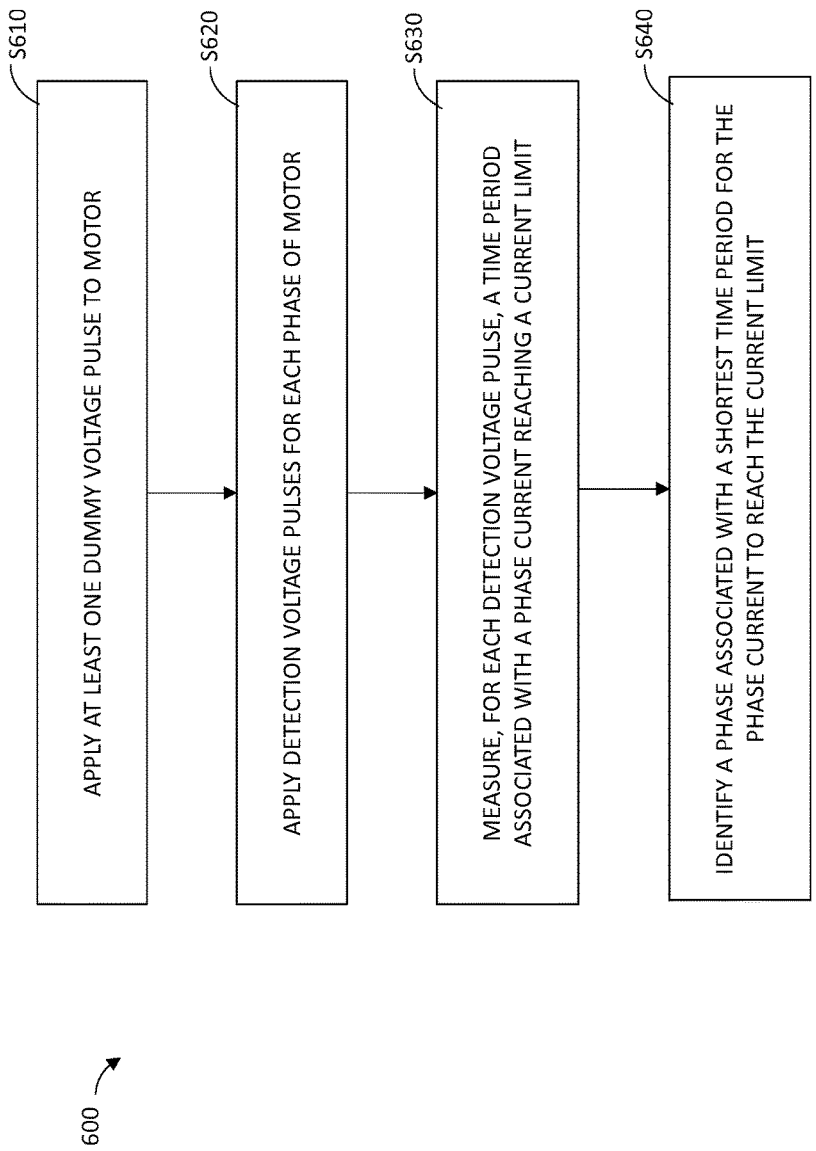
FIG. 6 is a flow diagram illustrating a process for applying voltage pulses to a brushless motor according to an embodiment.

FIG. 6 is a flow diagram illustrating a process 600 for determining a position of a rotor of a three-phase brushless motor according to an embodiment. The process 600 may be performed by the motor driver circuit 4-110 and, accordingly, is described herein by reference thereto. It will be appreciated that the process 600 may be performed on any suitable hardware. Although the process 600 is described with respect to a three-phase brushless motor, embodiments are not limited thereto.

At S610, the motor driver 4-110, via the voltage pulse module 430, applies at least one dummy voltage pulse to the three-phase brushless motor 2-120. For example, the motor driver 4-110 may apply one, two, or many dummy voltage pulses to the three-phase brushless motor 2-120. The motor driver 4-110 applies dummy pulses in order to raise a voltage level used to generate a current during an initial detection voltage pulse applied to the three-phase brushless motor 2-120.

At S620, the motor driver 4-110, via the voltage pulse module 430, applies detection voltage pulses to the three-phase brushless motor 2-120 for each driving phase of the three-phase DC brushless motor 2-120. For example, the motor driver 4-110 may apply the first through sixth detection voltage pulses 5-310*a* through 5-310*f* corresponding to the first through sixth driving phases of the three-phase brushless motor 2-120, respectively.

Thus, the motor driver 4-110 may apply an initial dummy voltage pulse 508 to the three-phase brushless motor 2-120, apply the first detection voltage pulse 5-310*a* to the three-phase brushless motor 2-120 using a motor voltage having a first voltage level raised by the applied initial dummy voltage pulse 508, and applies subsequent second through sixth detection voltage pulses 5-310*b* through 5-310*f* to the three-phase brushless motor 2-120 using a motor voltage having second through sixth voltage levels similar to the first voltage level.

At S630, the motor driver 4-110 measures, for each applied detection voltage pulse 5-310*a* through 5-310*f*, a time period associated with an induced phase current reaching a predetermined current limit. For example, the position identification module 440 measures a time period in which the induced current within the first, second and third phase circuitry 220, 230, and 240 associated with the three-phase brushless motor 2-120 reached the predetermined current limit.

At S640, the motor driver 4-110 identifies a driving phase associated with a shortest time period for the phase current to reach the predetermined current limit. For example, the position identification module 440 identifies the driving phase associated with the shortest time period, and determines a position of the motor 1-120 (e.g., a position of an internal rotor with respect to an internal coil) that corresponds to the identified driving phase.

In an embodiment, the motor driver 4-110 applies the detection voltage pulses 5-310*a* through 5-310*f* to the three-phase brushless motor 1-120 before a shortest time period is measured. For example, if the first detection voltage pulse 5-310*a* (associated with a first driving phase) realizes an induced current having a predetermined magnitude in a time period of 200 μs, a second detection voltage pulse 5-310*b* (associated with a second driving phase) realizes an induced current in a time period of 160 μs, and a third detection voltage pulse 5-310*c* (associated with a third driving phase) realizes an induced current in a time period of 240 μs, a fourth detection voltage pulse 5-310*d* (associated with a fourth driving phase) realizes an induced current having a predetermined magnitude in a time period of 220 μs, a fifth detection voltage pulse 5-310*e* (associated with a fifth driving phase) realizes an induced current in a time period of 170 μs, and a sixth detection voltage pulse 5-310*f* (associated with a sixth driving phase) realizes an induced current in a time period of 240 μs, the position identification module 440 determines the position of the motor 2-120 corresponds to the second driving phase of the motor 2-120.

In an embodiment, when the position of the motor has been determined, additional detection voltage pulses that do not reach the induced current limit within the lowest time period (e.g., 160 μs) are optionally terminated early (for example, when a current sensing pulse is longer than a previously recorded pulse).

Figure 7:
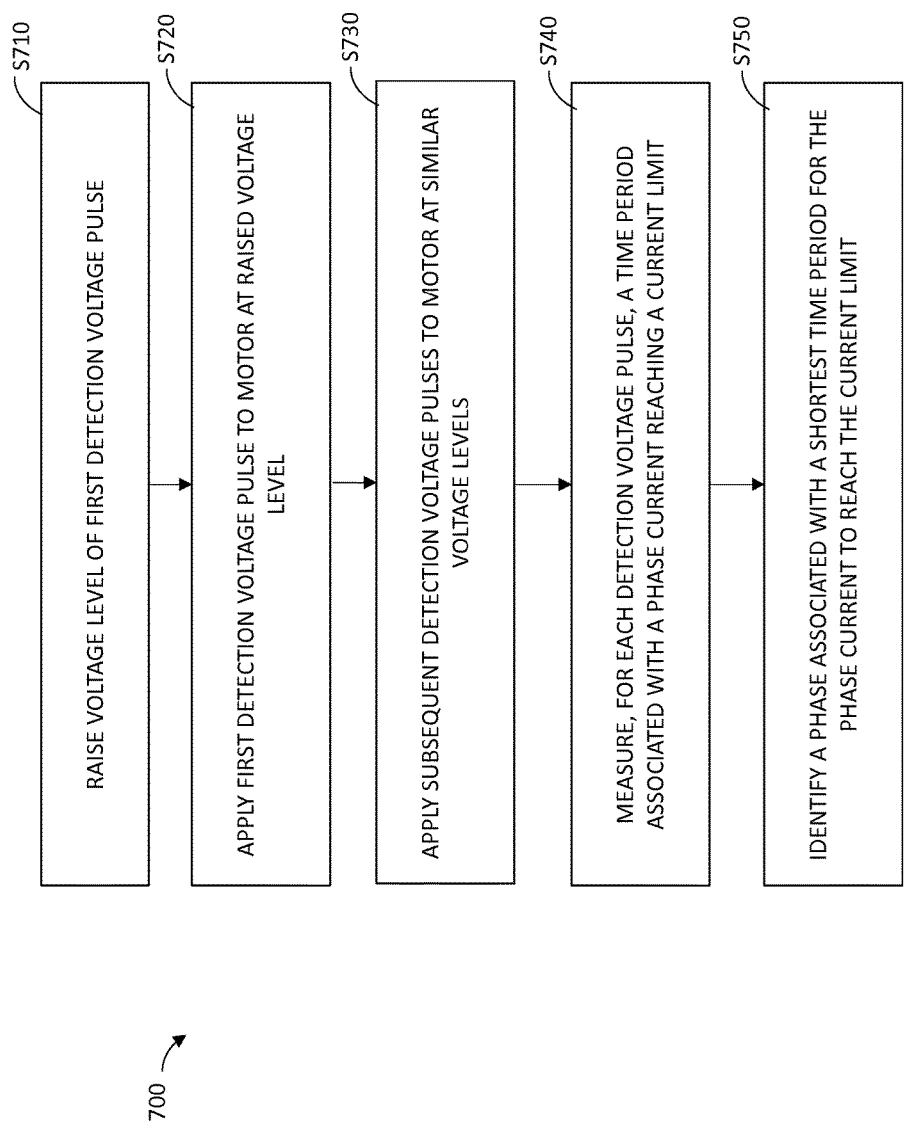
FIG. 7 is a flow diagram illustrating a process for identifying a position of a brushless motor according to an embodiment.

As described herein, in some embodiments, the motor driver 4-110 applies voltage pulses to the three-phase brushless motor 2-120 in order to determine a starting position of the motor 2-120. FIG. 7 is a flow diagram illustrating a process 700 for identifying a position of the three-phase brushless motor 2-120 according to an embodiment.

At S710, the motor driver circuit 4-110 raises a voltage level of a first detection voltage pulse to be applied to the three-phase brushless motor 2-120 for each phase of the three-phase DC brushless motor 2-120. For example, the motor driver circuit 4-110 may apply at least one dummy voltage pulse 508, or multiple dummy voltage pulses 406 and 408 to the three-phase brushless motor 2-120 before applying any detection voltage pulses to the three-phase brushless motor 2-120.

At S720, the motor driver circuit 4-110 applies the first detection voltage pulse 5-310*a* to the three-phase brushless motor 2-120 having the raised voltage level, and, at S730, applies subsequent detection voltage pulses 5-310*b* through 5-310*f* to the three-phase brushless motor 2-120 having voltage levels similar to the voltage level of the first detection voltage pulse 5-310*a*.

At S740, the motor driver circuit 4-110 measures, for each applied detection voltage pulse 5-310*a* through 5-310*f*, a time period associated with a phase current reaching a predetermined current limit. The motor driver circuit 4-110 identifies a driving phase associated with a shortest time period for the phase current to reach the predetermined current limit (S750).

Thus, the motor driver 3-110 utilizes dummy pulses to normalize and minimize differences between the voltage levels of detection voltage pulses 5-310*a* through 5-310*f* applied to the three-phase brushless motor 2-120 (or other similar motors).

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. A method for identifying a position of a multi-phase brushless motor, the method comprising:
    applying at least one dummy voltage pulse to the motor;
    applying a plurality of detection voltage pulses to the motor, each detection voltage pulse corresponding to a respective driving phase of the motor;
    measuring a time period associated with a current, the current reaching a predetermined current limit when a corresponding one of the plurality of detection voltage pulses is applied to the motor; and
    identifying a driving phase associated with a shortest time period for the current to reach the predetermined current limit,
    wherein applying the at least one dummy voltage pulse includes applying a dummy voltage pulse that raises a voltage level of a motor voltage used to generate an initial detection voltage pulse applied to the motor.

2. The method of claim 1, wherein the at least one dummy voltage pulse to the motor is applied before applying the plurality of detection voltage pulses.

3. The method of claim 1, wherein the dummy voltage pulse is a first dummy voltage pulse, and wherein applying the at least one dummy voltage pulse further includes applying a second dummy voltage pulse to the motor.

4. The method of claim 1, wherein the motor is a three-phase brushless motor, and the plurality of detection voltage pulses includes six detection voltage pulses.

5. The method of claim 1, wherein applying the plurality of detection voltage pulses includes applying the plurality of detection voltage pulses before the shortest time period is identified.

6. The method of claim 1, wherein the plurality of applied detection voltage pulses are generated using the motor voltage.

7. The method of claim 1, wherein the motor voltage has a first voltage level before the at least one dummy voltage pulse is applied, and
wherein each of the applied detection voltage pulses is generated using the motor voltage having a second voltage level raised by the at least one dummy voltage pulse, the second voltage level being higher than the first voltage level.

8. The method of claim 1, further comprising increasing the current to reach the predetermined current limit when the corresponding one of the plurality detection voltage pulses is applied.

9. An apparatus, comprising:
a voltage pulse module configured to generate a plurality of detection voltage pulses; and
a position identification circuit configured to generate at least one dummy voltage pulse prior to generating the plurality of detection voltage pulses, to determine a single detection voltage pulse of the plurality detection voltage pulses according to a plurality of currents associated with respective detection voltage pulses of the plurality of detection voltage pulses, and to determine a plurality of time periods for the plurality of currents to reach a predetermined value, respectively, each of the plurality of currents reaching the predetermined value when a corresponding one of the plurality of detection voltage pulses is applied to the motor,
wherein the at least one dummy voltage pulse includes a specific dummy voltage pulse that raises a voltage level of a motor voltage used to generate an initial detection voltage pulse applied to the motor.

10. The apparatus of claim 9, wherein the position identification circuit is further configured to determine the single detection voltage pulse associated with the current having a shortest time period of the plurality of time periods.

11. The apparatus of claim 9, wherein the voltage pulse module generates a plurality of dummy voltage pulses.

12. The apparatus of claim 10, wherein the voltage pulse module generates the detection voltage pulses before the shortest time period is determined.

13. The apparatus of claim 9, further comprising a multi-phase brushless motor, wherein the apparatus is configured to:
induce a dummy current in a driving phase of the motor using the at least one dummy voltage pulse; and
induce the plurality of currents associated with respective detection voltage pulses in respective driving phases of a plurality of driving phases of the motor.

14. The apparatus of claim 13, wherein:
each of the plurality of currents associated with respective detection voltage pulses is generated using the motor voltage, the motor voltage having a first voltage level before the at least one dummy voltage pulse is applied to the motor;
a cessation of the specific dummy voltage pulse causes the motor voltage to increase to a second voltage level, the second voltage level being higher than the first voltage level; and
a cessation of each of the detection voltage pulses causes the motor voltage to increase to substantially equal to the second voltage level.

15. A method for identifying a position of a three-phase brushless DC motor, the method comprising:
applying at least one non-detection voltage pulse to the three-phase brushless DC motor;
raising a voltage level of a first detection voltage pulse to be applied to the three-phase brushless DC motor for each phase of the three-phase DC brushless motor;
applying the first detection voltage pulse to the three-phase brushless DC motor having the raised voltage level;
applying a plurality of detection voltage pulses to the three-phase brushless DC motor having voltage levels substantially equal to the voltage level of the first detection voltage pulse;
measuring a time period associated with a phase current, the phase current reaching a predetermined current limit when a corresponding one of the plurality of detection voltage pulses is applied to the three-phase brushless DC motor; and
identifying a phase associated with a shortest time period for the phase current to reach the predetermined current limit,
wherein the at least one non-detection voltage pulse and the first detection voltage pulse are generated using a motor voltage, the motor voltage has a first voltage level before the at least one non-detection voltage pulse is applied, and the first detection voltage pulse is generated using the motor voltage having a second voltage level raised by the at least one non-detection voltage pulse, the second voltage level being higher than the first voltage level.

16. The method of claim 15, wherein multiple non-detection pulses are applied to the three-phase DC brushless motor before applying the first detection voltage pulse.

17. The method of claim 15, wherein applying the plurality of detection voltage pulses include applying the plurality of detection voltage pulses until the shortest time period is identified.

* * * * *